Jan. 31, 1967  W. E. CORSON  3,301,352
LAMINATED VEHICLE WHEEL CHOCK
Filed April 14, 1966
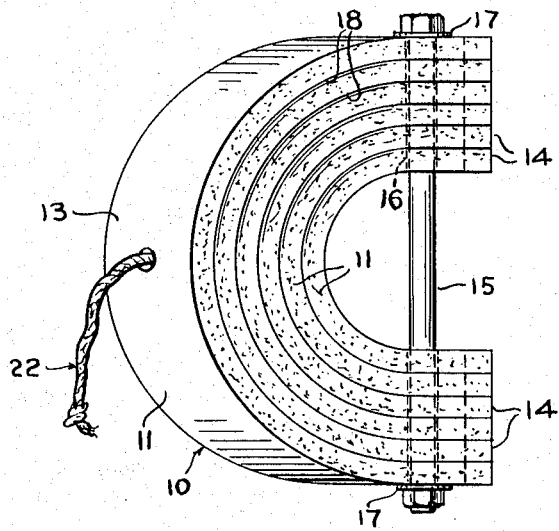
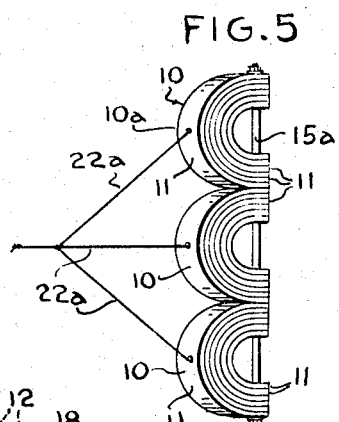
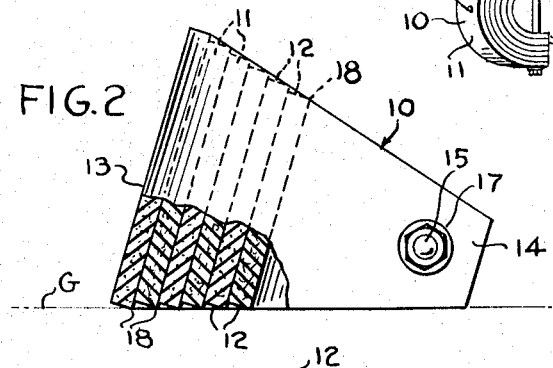
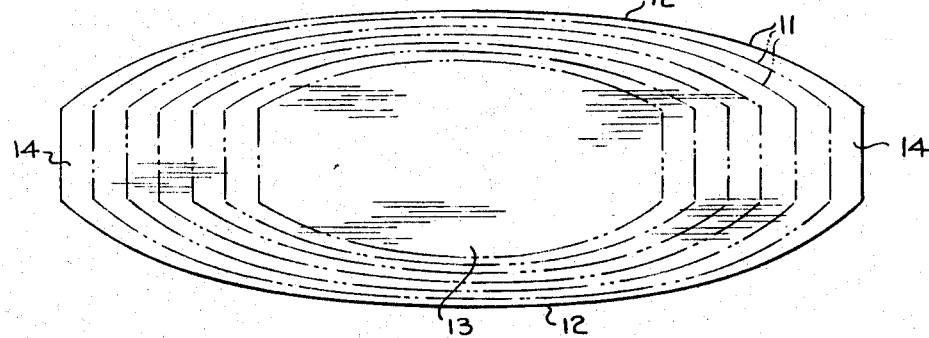
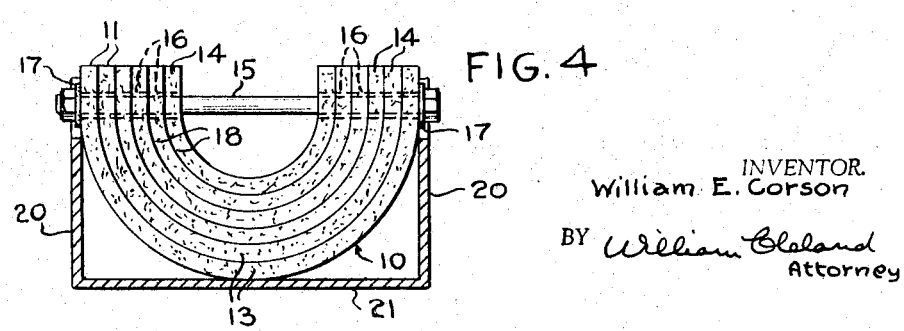
INVENTOR.
William E. Corson
BY William Cleland
Attorney

United States Patent Office 3,301,352
Patented Jan. 31, 1967

3,301,352
LAMINATED VEHICLE WHEEL CHOCK
William E. Corson, 285 Hedgewood Drive,
Akron, Ohio 44319
Filed Apr. 14, 1966, Ser. No. 542,647
11 Claims. (Cl. 188—32)

This invention relates to chocks for blocking vehicle wheels.

Prior W. E. Corson United States Patent 2,954,101, dated September 27, 1960, discloses wedge-shaped wheel chocks composed of laminations of resilient rubber pads. In practice, however, it has been found that the single wedge-shaped chock of the patent was heavy and somewhat cumbersome to handle, and was relatively expensive to produce.

An object of the present invention is to provide a compact, easy to handle, laminated rubber wheel chock which is substantially light in weight as compared with the patented chock, while maintaining an effective wedge-shaped configuration, and which at the same time is capable of being produced at less than half the cost of the patented chock of the same blocking capacity.

Other objects of the invention will be manifest from the following brief description and the accompanying drawings.

Of the accompanying drawings:

FIGURE 1 is a top plan view of a laminated wheel chock embodying the features of the invention.

FIGURE 2 is a front elevation of the same, partly broken away, and in section.

FIGURE 3 is a developed top plan view of one of the pads for the chock of FIGURES 1 and 2, with a series of additional pads for the same indicated in chain-dotted lines.

FIGURE 4 is an end elevation on a reduced scale of the assembled chock shown in FIGURES 1 and 2, in association with a fixture used for assembling the chock, the fixture being partly broken away and in section.

FIGURE 5 is a view corresponding to FIGURE 1, on a reduced scale, illustrating a modification of the invention for use on large airplane wheels and multiple wheel assemblies.

Referring particularly to FIGURES 1 and 2 of the drawings, there is illustrated a laterally U-shaped and vertically wedge-shaped wheel chock 10, composed of a plurality of arcuately superposed, resilient, elastic pads 11, 11 of similar shapes, but of progressively decreasing sizes, as illustrated in developed form by means of full and chain-dotted lines in FIGURE 3. As best shown in said FIGURE 3, each pad may have squared, oppositely arcuate side edges 12, 12 converging or tapering from relatively wide central portions 13, 13 thereof toward opposite small ends 14, 14 of the same. The U-shaped pads are yieldingly formed and arranged one within the other, in descending superposed order of decreasing sizes to provide the U-shaped, laminated chock or block 10, in which the squared opposite side edges 12 lie generally in two angularly disposed planes defining the wedge shape of the chock. For maintaining the U-shape of the chock 10, a bolt 15 is extended through aligned openings 16, 16 of the small ends 14 of the pads, and tightened against the resiliency of the arcuately formed pads, to clamp washers 17, 17 against the small ends of the outermost pad. The squared edges of the superposed pads define arcuate tooth-like corner edges 18, 18 on two opposite sides of the chock, so that the chock is reversible for use to block a vehicle wheel (not shown).

For making the improved chock of FIGURES 1 and 2, pads 11 of resilient elastic material, such as scrap rubber tire tread material, with or without reinforcing fabric, or molded tread rubber stock, are provided in a series of progressively decreasing sizes and shapes, generally as shown in FIGURE 3, and with spaced holes 16, 16 prelocated therein. Referring to FIGURE 4, pads 11 are yieldingly bent into U-shape, and then depressed between spaced walls 20, 20 of a suitable channel-shaped fixture 21, starting with the largest pad, arcuately to form and center one pad within the other in descending superposed order of decreasing sizes, thereby to produce an arcuate laminated chock in which the opposite side edges 11, 11 of the pads lie substantially in angularly disposed planes defining the vertical wedge-shaped configuration of the laterally U-shaped chock. In this condition, the bolt 15 is inserted through the pad openings 16 and operated to clamp retaining washers 17 against the outer pads, and thereby to maintain the chock in U-shaped condition. For manually carrying the chock, a knotted rope or cable 22 may be received through apertures 23 centrally aligned in the wide portions 13 of the pads 11 (see FIGURE 1).

In use of the improved chock 10 for blocking a vehicle wheel (not shown), pressure of the usual tread portions of a pneumatic tire on the wheel against the upper tooth-like edges 18 of the chock, will cause corresponding pads 11 to be more or less individually urged toward firm non-skid engagement of the opposite tooth-like edges 18 of the pads with the ground G (see FIGURE 2). The upper tooth-like edges will likewise be in non-skid engagement with the tire.

Sudden impact of a wheel tire upon the chock 10 will be absorbed by the elasticity of the laminated pads 11. In addition, the shock-absorbing action of the chock is enhanced by yielding support of the unattached, complementally disposed, curvate walls of the adjacent pads. Heavy pressure of a wheel on the chock, tending to cause individual pads to bow forwardly of the wheel, may be modified or controlled by utilization of the arcuate configuration of the chock body, and of the individual pads thereof, in conjunction with predetermined variations in the elastic properties of some or all of the pads.

It has been found that a highly efficient, compact chock, produced in accordance with the present invention, will weigh less than half as much as a wheel chock of comparable capacity made in accordance with the disclosure of the aforesaid prior patent, and for approximately one-third the cost of making the patented wheel chock.

Referring to FIGURE 5, there is illustrated a modified form of chock 10a for use on large airplane or like wheels having very large tires, or for use on wheel assemblies which include two or more pneumatic tires mounted in tandem. To this end, two or more chock units 10, 10 (see FIGURES 1 and 2) are mounted on a long bolt or rod 15a, substantially in the same manner as before. The inherent tendency of the U-shaped chock units 10 to expand into frictional interengagement of adjacent sides thereof is effective to hold the units against turning with reference to each other on the bolt 15a.

For moving or carrying the chock 10a, ropes 22a, 22a corresponding to rope 22 of FIGURE 1, are connected to form a suitable harness, as shown in FIGURE 5.

In all forms of the invention the central space between the spaced legs of the respective U-shaped chocks 10 should be substantially narrower than the widths of the tires which are to be blocked thereby. Spaces of about half the widths of the tire treads would be suitable for this purpose, so that the spaces will be bridged by the blocked tire.

Modifications of the invention may be resorted to without departing from the spirit thereof or the scope of the appended claims.

What is claimed is:

1. A chock for blocking vehicle wheels or the like comprising: a plurality of superposed arcuate pads of progressively decreasing sizes and each having opposite side edges converging from a relatively wide central portion of the pad toward opposite small ends thereof, whereby the superposed pads define a wedge-shaped block; and means for retaining said pads in said wedge-shaped superposed relation.

2. A chock as in claim 1, said means for retaining comprising aligned openings in small ends of the superposed pads, and a restraining element received through said aligned openings.

3. A chock as in claim 2, said pads being of flexible elastic material.

4. A chock as in claim 3, said edges of the superposed pads being squared to expose opposite series of arcuate tooth-like corner edges.

5. A chock as in claim 4, said pads having aligned apertures through said central portions of the superposed pads, and a lifting member being received through said apertures and provided with means for supporting the block for carrying the same by the lifting member.

6. A chock as in claim 1, said pads having apertures through the central portions of the superposed pads, and a lifting member being received through the aligned apertures and provided with means for supporting the block for carrying the same by the lifting member.

7. A method of making a vehicle or like wheel chock, comprising the steps of providing a plurality of pads of flexible resilient material and of progressively decreasing sizes, and each having opposite side edges converging from a relatively wide central portion of the pad toward opposite ends thereof; progressively bending the pads, starting with the largest, arcuately to form one within the other in descending superposed order of decreasing sizes to produce an arcuate, laminated block in which said opposite side edges of the pads lie substantially in angularly disposed planes to define a wedge shape of the block; and affixing a restraining member between superposed opposite ends of the pads to maintain the arcuate forms thereof and said wedge shape of the block.

8. A method as in claim 7, wherein said restraining member is a bolt received through apertures provided in the ends of the pads, and which are aligned by said steps of progressively bending and forming the same one within the other.

9. A chock for blocking vehicle wheels or the like comprising: an elongated rod; a plurality of wedge-shaped blocks; and spaced means on said rod for retaining said blocks in tandem thereon; each of said blocks including a plurality of U-shaped pads of progressively decreasing sizes and each pad having opposite side edges converging from a relatively wide central portion thereof to opposite small ends of the same, whereby the superposed pads of the respective block define the wedge shape of the same.

10. A chock as in claim 9, said pads being generally of resilient, elastic material.

11. A chock as in claim 10, said edges of said superposed pads being squared to expose arcuate tooth-like corner edges.

References Cited by the Examiner

UNITED STATES PATENTS

| | | | |
|---|---|---|---|
| 1,864,923 | 6/1932 | Mesmer | 29—526 X |
| 2,954,101 | 9/1960 | Corson | 188—32 |

MILTON BUCHLER, *Primary Examiner.*

B. S. MOWRY, *Assistant Examiner.*